United States Patent [19]
Ballard et al.

[11] 4,269,628
[45] May 26, 1981

[54] COMPOSITIONS OF VERMICULITE LAMELLAE AND SOLID PARTICULATE MATERIALS

[75] Inventors: Denis G. H. Ballard, Littleton; William N. E. Meredith, Hoole; Graham R. Rideal, Handbridge, all of England

[73] Assignee: Imperial Chemical Industries Limited, London, England

[21] Appl. No.: 66,467

[22] Filed: Aug. 13, 1979

[30] Foreign Application Priority Data

Aug. 17, 1978 [GB] United Kingdom ............... 33723/78

[51] Int. Cl.³ .............................................. C04B 41/28
[52] U.S. Cl. ......................................... 106/86; 106/88; 106/291; 106/DIG. 3; 106/118; 106/121; 252/378 R; 252/62; 428/310; 428/920
[58] Field of Search ................... 106/286.5, 86, 87, 88, 106/291, DIG. 3; 252/378 R

[56] References Cited

U.S. PATENT DOCUMENTS

| | | | |
|---|---|---|---|
| 2,204,581 | 6/1940 | Denning | 106/DIG. 3 |
| 2,311,588 | 2/1943 | Denning | 106/DIG. 3 |
| 2,364,436 | 12/1944 | Frisch | 106/DIG. 3 |
| 3,764,456 | 10/1973 | Woodhams | 106/DIG. 3 |
| 4,130,687 | 12/1978 | Ballard | 106/88 |

FOREIGN PATENT DOCUMENTS

| | | |
|---|---|---|
| 614561 | 2/1961 | Canada ............... 106/DIG. 3 |
| 2741857 | 3/1978 | Fed. Rep. of Germany . |
| 2813941 | 10/1978 | Fed. Rep. of Germany . |
| 1202097 | 8/1970 | United Kingdom . |

*Primary Examiner*—Brian E. Hearn
*Attorney, Agent, or Firm*—Cushman, Darby & Cushman

[57] ABSTRACT

A composition comprising vermiculite lamellae (delaminated vermiculite) and one or more solid particulate materials which have a basic reaction in water, especially magnesium oxide. These particulate additives improve the physical properties of vermiculite articles especially the compressive strength and stability to water of foam.

15 Claims, No Drawings

COMPOSITIONS OF VERMICULITE LAMELLAE AND SOLID PARTICULATE MATERIALS

This invention relates to compositions containing the mineral vermiculite in delaminated form and solid particulate materials.

It is known that granules of the layer silicate mineral vermiculite may be swollen by the action of aqueous salts and thereafter the structure may be delaminated by mechanical shearing of the swollen granules to yield thin platelets termed "vermiculite lamellae".

Other layer silicate minerals for example hydro biotites and chlorite vermiculites also contain a substantial proportion of vermiculite layers and these minerals also may be swollen and delaminated in the same or similar manner. Minerals which contain vermiculite layers may give rise to thin lamellae when swollen and delaminated and it is to be understood that all such minerals are included in the term "vermiculite" as used throughout this specification.

By the term "vermiculite lamellae" as used herein we mean particles of delaminated vermiculite that are platelets having a thickness of less than one tenth of a micrometer ($10^{-7}$ m) usually less than one hundredth of a micrometer ($10^{-8}$ m).

Furthermore it is known, for example from U.K. Pat. Nos. 1,016,385 and 1,119,305, U.S. Pat. No. 4,130,687 and German Offenlegungsschrift No. 2,741,857 that dispersions of vermiculite lamellae may be made and used to form shaped solid articles composed of vermiculite lamellae for example fire-resistant sheet and rigid foams. The solid articles are made in general by removal of water from vermiculite suspensions whereby the vermiculite lamellae adhere together by their own mutually attractive forces. The suspension may be cast to give shaped articles for example, sheets or rigid foams, the latter by gasification of the suspension of vermiculite lamellae before removal of water therefrom.

Articles composed wholly of vermiculite possess a degree of structural integrity which may render them useful for a number of applications, but for most practical purposes their compressive strength and stability in water are too low. It has been proposed in U.K. Pat. No. 1,016,385 to improve the water-stability properties of sheet materials made from suspensions of vermiculite lamellae by treating the sheet subsequent to its formation with aqueous solutions of electrolytes, for example solutions of magnesium chloride, and removing the liquid medium from the treated sheet. In the case of sheets or papers this post-treatment does result in an improvement in water-stability, though we have observed little if any improvement in the water stability of rigid foams after the treatment. Moreover, even in the case of sheets or papers, it is clearly desirable to avoid the need for a post-treatment and to produce directly a product having improved water-stability and compressive strength.

We have now found that the physical properties and particularly the compressive strength and water stability of solid articles composed of vermiculite lamellae, especially rigid foams, may be improved by the intimate mixing therein during formation of the articles of solid particles having a basic reaction in water.

According to the present invention we provide a composition comprising vermiculite lamellae and a solid particulate material having a basic reaction in water.

The compositions may be wet or dry (aqueous liquids being present in the wet compositions) and may take a variety of different physical forms for example a paste, slurry, suspension, wet foam, dry powder, and pellets or a dry shaped article, including a rigid foam.

Among the physical properties of a shaped article improved by the invention compared with the similar article composed wholly of vermiculite we should mention strength, in particular compressive strength (especially important in the use of foamed materials) and stability to water. As stated hereinbefore, articles made wholly of vermiculite exhibit low compressive strength and poor water-stability. They tend to absorb liquid water and thereby disintegrate. This effect may be prevented in the compositions according to the invention, especially in the shaped articles included therein.

The solid particulate material added as compressive strength and/or water stability improver is most conveniently added to the vermiculite lamellae when they are in the form of an aqueous suspension or slurry (which may already be foamed if desired) but it may be added in other ways, e.g. to a dried powder of vermiculite lamellae and in all cases the particles should be intimately mixed therewith. It has been observed that when water is present in the compositions according to the invention there may be a slow reaction between the vermiculite lamellae and the added particles probably, we believe, because the added particles yield basic cations in water. Whilst this reaction is thought to be desirable for the improvement in physical properties of the products, provided the character of individual lamellae is maintained, it can be disadvantageous if allowed to proceed too fast during the mixing of the components together with water because flocculation of the vermiculite suspension may occur causing impairment of some properties of the products, e.g. the bubble size and density of foams made from the suspension.

Accordingly, and depending to some extent upon the particular compressive strength and/or water stability improver used, there may be some practical problems in the handling of aqueous compositions of this invention, especially if rigid foams of low density are desired as the end-product. The nature of the compressive strength and/or water stability improver added should be chosen with care having in mind the article to be formed, to minimize any handling problems which might be encountered.

Solid particulate materials which provide the improvement in properties of the vermiculite articles include basic materials and particularly basic materials which have a limited solubility in water, for example a solubility in water of not greater than 10 g/l and preferably not greater than 3 g/liter. Materials which are more soluble than 10 g/l tend to cause too rapid flocculation of the aqueous vermiculite suspensions. Whilst materials less soluble than 3 g/l tend to produce few ions in solution, there is an adequate rate of reaction with the vermiculite lamellae, which reaction we believe is desirable. It is to be understood that the range of less than 3 g/l is given as a guide only and that some materials of water solubility outside the range may nevertheless be useful in the practice of the invention. Compositions which flocculate rapidly are difficult to handle because they may not be processable to the final articles sufficiently speedily to prevent the flocculation spoiling the formation of acceptably strong articles (especially low density foamed articles, for example foamed slabs or boards of vermiculite to be used for thermal insulation purposes). We have found that solid particulate materials which are oxides or hydroxides of the alkaline earth metals are useful additives, particularly the oxides and hydroxides of calcium and magnesium. The especially preferred particulate material is magnesium oxide because this material possesses an especially desirable combination of properties for improving articles made from vermiculite compositions, in particular for significantly improving both the compressive strength and the water stability of the articles.

Magnesium oxide imparts both water stability and compressive strength to rigid foamed articles made of vermiculite lamellae and allows strong rigid foams to be made having a lower density than would be possible with vermiculite alone. Particulate magnesium oxide is conveniently added either to a slurry or a foamed suspension of vermiculite lamellae and depending on the activity of the grade of the magnesium oxide used an increase in viscosity of the slurry or foamed suspension occurs during mixing, e.g. for ca. 10 minutes. The increase in viscosity is useful in the manufacture of rigid foams of vermiculite because it provides easier entrainment of gas bubbles and a fairly stable wet foam which is more easily handled before the drying stage when the foam is transferred for example from a mixer to a mould, conveyor belt or oven.

According to a preferred aspect of the invention we provide a foamed composition comprising vermiculite lamellae and particles of magnesium oxide, especially a dry rigid foam.

In a particularly preferred embodiment of the invention there is provided a rigid foam comprising a cellular structure having the cell walls composed of overlapping vermiculite lamellae adhering together by mutually attractive forces and containing particles of a compressive strength improver and/or water stability improver, preferably magnesium oxide. The individual vermiculite lamellae are in the form of platelets or flakes having a small dimension (thickness of the plate) preferably less than 0.05 $\mu$m, especially less than 0.005 $\mu$m and a length and/or breadth dimension of more than a hundred, often at least a thousand, times greater than the small dimension.

Compositions according to the invention in the form of rigid foams will usually be of density less than 500 Kg/m$^3$ and preferably less than 200 Kg/m$^3$. Especially lightweight foams may be of density as low as 60–100 Kg/m$^3$. The density of the foam may be varied in a number of ways, for example by incorporating different amounts of gas into the suspension during gasification thereof or by altering the solids content of the suspension. For very low density foams the solids content may be for example from 5 to 10% by weight whilst for higher density foams, higher solids contents, e.g. 30% by weight or greater, may be employed.

The particles of the additive, e.g. magnesium oxide, are preferably within the size range 1 $\mu$m to 20 $\mu$m and we have observed that samples of magnesium oxide in the lower half of this range produce stronger, lower density foams than those made with larger particles of magnesium oxide.

The behaviour of the particulate material added to the vermicullite, for example the rate of solubility in water and hence the rate at which basic ions will be produced, may be controlled by surface treatment of the particles for example coating the particles with water soluble films or heat-treatment of the particles to partially fuse the surface layer of each particle.

The solid particulate additive, for example the oxide or hydroxide of an alkaline earth metal is preferably present in the composition at a concentration from 1% to 40% especially from 3% to 15% by weight of vermiculite. Magnesium oxide is most usefully present at greater than 3% w/w and less than 15% w/w; higher concentrations than 15% w/w may be used but without significant advantage.

It is desirable to mould or to gasify and cast an aqueous composition of magnesium oxide and vermiculite within a reasonable time after mixing in the magnesium oxide otherwise flocculation of the mixture may occur and the final properties of the article will not be maximised. However, a dry composition of magnesium oxide and vermiculite lamellae, as described in co-pending British Patent Application No. 33722/78, may be stored for several months and used when desired by adding water to form a slurry or paste and casting this slurry or paste, with or without gasification, into shaped articles.

We prefer the vermiculite lamellae or suspensions thereof to have been classified prior to the formation of any of the compositions described herein and in particular we prefer that all vermiculite particles greater than 50$\mu$ and preferably greater than 20$\mu$ in their largest dimension have been removed.

The compositions herein described may, if desired contain mixtures of compressive strength improvers and/or water stability improvers. They may in addition contain other components which may further improve the physical properties of articles made therefrom. Fillers, especially light-weight fillers or reinforcing fillers may advantageously be incorporated particularly in foams for example silica, glass fibre, glass micro-balloons (such as "Cenospheres" or "Eccospheres"), kaolin, fly ash, Portland cement and the carbonates of alkaline earth metals.

As discussed hereinbefore, the compositions of the invention may have a variety of physical foams such as suspensions, notably aqueous suspensions, powders, and shaped articles e.g. sheets or papers and dry rigid foams. Compositions in the form of dry, shaped articles are made by shaping and removing water from compositions in the form of suspensions, usually aqueous suspensions.

According to a further aspect of the invention, therefore, there is provided a process for the preparation of a solid shaped article which comprises shaping a suspension of vermiculite lamellae and a compressive strength improver and/or a water-stability improver and removing water from the shaped composition. A particular embodiment of this process comprises gasification of the suspension to form a froth followed by removal of the liquid medium from the froth by drainage and/or evaporation. Such a process for the production of a rigid foam from a suspension of vermiculite lamellae in a liquid medium is described in U.S. Pat. No. 4,130,687. The process described in this specification, the disclosure of which is incorporated herein by reference, can be used to form the rigid foams of the present invention, the process being modified by incorporating a compressive strength improver and/or a water-stability improver in the suspension prior to, during or after gasification of the suspension.

A process for the production of non-cellular shaped articles which can be used with a similar modification for making shaped articles according to the present invention is described in co-pending U.K. patent application Nos. 39510/76: 51425/76 and the corresponding German Offenlegungsschrift No. 2,741,857, the disclosure of which is incorporated herein by reference. The process described in this reference is modified by the incorporation of a compressive strength improver and/or a water-stability improver in the aqueous suspension in the described process which comprises swelling vermiculite ore by contact with an aqueous solution of at least one salt of sodium, lithium or an organo-substituted ammonium cation, followed by aqueous washing, delamination of the swollen vermiculite by shearing the swollen particles of vermiculite to form a suspension of lamellae having dimensions less than 50 $\mu$m and a flocculated viscosity of at least 100 centipoise, elimination from the suspension of all particles having a diameter larger than 50 $\mu$m and removal of water from the suspension whilst the article is being shaped against a solid surface by deposition of vermiculite particles from the suspension.

The production of rigid foams from a suspension of vermiculite lamellae and particulate additive involves gasification of the suspension and removal of the liquid medium from the resulting froth. Gasification may be effected by beating air or another aqueous medium into the suspension as is described in the aforementioned U.S. Pat. No. 4,130,687. Alternatively gasification and rigid foam formation may be effected by the technique described in co-pending British Patent Application No. 47664/76 and corresponding German offenlegungsschrift No. 2,750,839, of which the disclosure is incorporated herein by reference, i.e. a process wherein electromagnetic energy having a frequency in the range from $10^4$ HZ to $10^{10}$ HZ is passed into the aqueous suspension of vermiculite lamellae during at least part of the process. A combination of gasification of the suspension by beating air into it followed by removal of liquid medium from the gasified suspension by subjecting it to electromagnetic radiation may be employed, if desired.

The shaped articles of and produced according to the processes of the present invention exhibit improved compressive strength and/or improved water-stability, depending upon the particular improver employed, compared with articles which do not contain the improver. This is especially marked in the case of articles made of rigid foams. In the case where the shaped article does not exhibit a marked improvement in water-stability, or even where improved water-stability is exhibited but is capable of further enhancement, the article may be treated to improve its water stability by the process described in co-pending British Patent Application No. 14551/77 and corresponding German Offenlegungsschrift No. 2,813,941 the disclosure of which is incorporated herein by reference. In this reference there is described a process for the stabilisation to water of a vermiculite article which comprises contacting the article with the vapour of a nitrogen compound having the formula $N(R_1)(R_2)(R_3)$ where the R groups may be the same or different and each is hydrogen or an organic (e.g. alkyl) group. The preferred vapour is ammonia vapour.

Vermiculite foam is a useful heat-resistant and heat insulating material which may be cast as a foam-filling for cavities and voids or as a coating for the outside of materials for example wood or steelwork; in both cases the vermiculite foam acting inter alia as a fire-protective layer. The vermiculite foam may be produced as a slab stock for subsequent fabrication or other lamination. Slabs of rigid vermiculite foam are useful as roofing materials for exterior and interior heat insulating fireproof panels, for cladding structural members especially steelwork, woodwork and pipework, for suspended ceilings, for furnace and oven insulation and for non-combustible insulation in automobiles. An inner sandwich of vermiculite foam as herein provided, optionally bounded for example by sheets of wood-veneer, paper, asbestos, mica or plastic, or by vermiculite sheet, forms useful decorative construction panels: the vermiculite foam may be sandwiched between plaster-board or sheets of thermo-setting resin, e.g. melamine resin. The fore-going structures form useful fire-resistant and/or sound insulating panels for the building industry, panels which may be maintained at temperatures of ca. 1000° C. without disintegration. Wet suspensions e.g. slurries or the gasified suspensions may be conveniently used to bond together previously formed vermiculite structures e.g. sheets or slabs of foam already in dried form and so cement several sheets together and build up larger structures. In a similar way the heat-exfoliated vermiculite granules may be cemented together by means of aqueous suspensions of lamellae and additives and thus a composite structure is formed consisting of the compositions of the present invention as a continuous cement between granules of heat-exfoliated vermiculite.

The surface of the rigid foam may be patterned or contoured by pressure from a die-stamp, press plates or between patterned rollers. Such contours or patterns may be decorative or functional as desired.

Articles which may be produced from the suspensions of vermiculite lamellae and other additives herein described include sheet, film, papers, coatings, crepe, capsules, sachets, castings and mouldings, composed of vermiculite lamellae adhering together by mutually attractive forces but improved in strength or resistance to water by the other materials. Laminated or sandwich structures of vermiculite foam or sheet with other materials, for example papers or plastics, may be made and corrugated sheet may be prepared by either depositing the vermiculite suspension against a suitably contoured substrate or by impressing the dry sheet between shaped press-platens or rollers.

Vermiculite articles made from the compositions herein described may be used for example in the following applications:

A. To provide a fire-proof barrier to control the burning of organic foams or of wood and other inflammable products.

B. To provide a flexible fire-proof packaging material able to prevent the spread of fire either by itself or when laminated to other materials e.g. polymer films or paper.

C. To provide a combined fire and moisture resistant barrier for example an external facing for building materials.

D. As a container for thermal insulation material which is of a powdered or fibrous nature to prevent the dispersion of the insulation either at high temperatures or after prolonged use.

E. To provide an electrical insulation layer (e.g. a sheathing for cables) that will not disintegrate when exposed to fire or other high temperature conditions.

F. As a fire-proof membrane that will provide a protected enclosure during fire conditions to restrict the spread of smoke or gases or other contamination.

G. As a protective screen, blanket or shield against sparks or flames e.g. from a welding torch.

H. As separators for articles being treated in furnaces or kilns or as spacers for valuable documents e.g. to reduce the risk of complete destruction by fire.

Vermiculite sheets made by casting or forming an aqueous paste or slurry of the vermiculite compositions described herein, with or without gasification, may be used as fire-resistant facings or layers in, for example, the manufacture of plastics foam laminates and especially isocyanate-based foam laminates such as polyurethane and polyisocyanurate foam laminates.

Thus, for example, the vermiculite sheet may be formed continuously by extruding an aqueous paste or slurry of the vermiculite composition onto a carrier belt, which may be a porous mesh, drying the sheet with hot air and either depositing an isocyanate-based foam mix on the sheet and processing it through a commercially available laminator such as that described in an article entitled "A New Development Machine for the Continuous Lamination of Rigid Urethane Foam" published in "Rubber and Plastics Age" 1966, Vol. 47, No. 1, page 57, or feeding the sheet as the bottom facing in a lamination process such as that described in U.K. Pat. No. 1,053,192 or as a centre core in a lamination process such as that described in U.K. Pat. No. 1,136,046. In all cases the isocyanate-based foam may contain glass fibre or other reinforcement to improve the stiffness and fire performance of the laminate.

The invention is illustrated by the following Examples.

EXAMPLE 1

A 20 Kg batch of South African vermiculite (Mandoval micron grade) was refluxed for 30 minutes in 25 l of saturated salt solution and after thorough washing in de-ionised water, filtered and returned to the 50 l reflux vessel where it was refluxed for a further 30 minutes in 25 l of 1 N n-butylammonium chloride solution. After thorough washing in de-ionised water and allowing to stand overnight the bulk volume of the ore had expanded to 70 l. The aqueous suspension of swollen vermiculite was adjusted to 20% w/w concentration then milled for 30 minutes in a Hobart vertical cutter mixer (Model VCM 40) at a speed of 3000 rpm, the larger vermiculite particles were removed from most batches by passing the suspension through a vibrating sieve having an aperture size of 50 μm. The suspension obtained from this classification step contained a lower solids concentration due to some larger particles of vermiculite being retained on the sieve. The suspension was concentrated by evaporation of water on a large heated tray until the concentration by weight of solids was again 20% w/w. The 20% w/w suspension classified or not was whipped into a foam using a Kenwood Chef mixer having a planetary beater. A known weight of wet foam and a weighed quantity of an alkaline earth oxide or hydroxide in particulate form were carefully blended together in the mixer using minimum speed and then the wet foam was placed in a tray heated to 70° C. in order to dry it. The compressive strengths of dried blocks of foam using different oxides and hydroxides are shown in Tables 1 and 2. The values of compressive strengths were determined on an Instron tensometer after equilibration in an atmosphere of relative humidity 52% for 18 hours and the density of each block was calculated from the weight and a volume measurement obtained from its overall dimensions.

TABLE 1

ADDITIVES TO VERMICULITE FOAM

| Vermiculite Slurry | Wet Foam | | | Dry Foam Properties | |
|---|---|---|---|---|---|
| | Additive | Mixing Time (mins) | Weight % Additive per wt. vermiculite | Density in Kg/m³ | Compressive Strength MN/m² |
| Unclassified, spray-dried vermiculite powder mixed with water to form slurry 20% w/w | MgO | 1.5 | 10 | 130 | 0.29 |
| Vermiculite from USA (Zonolite No 4 Grade) (instead of S.African) 12% w/w slurry | MgO | 1.5 | 10 | 70 | 0.26 |
| Spray-dried vermiculite powder classified to particles <50 μm mixed with water to form slurry 20% w/w | Mg(OH)₂ | 1.5 | 17 | 140 | 0.41 |
| | Ca(OH)₂ | 1.5 | 9 | 140 | 0.30 |
| Slurry containing 20% vermiculite classified to <50μ | Ca(OH)₂ | | 17 | 290 | 0.68 |
| | None | For comparison typical properties are quoted | | 200 | 0.15 |
| | | | | 400 | 0.24 |

TABLE 2

Magnesium Oxide added to Vermiculite Foams

| | Wet Foam | | Dry Foam | | |
|---|---|---|---|---|---|
| Aqueous slurry % wt. vermiculite | % weight MgO per unit wt vermiculite | Mixing time (min) | Density Kg/m³ | Compressive Strength MN/m² | Comments |
| 20 | 19 | 10 | 250 | 0.29 | mixing time may have caused some flocculation |
| 20 | 37 | 10 | 440 | 0.56 | |
| 20 | 9 | 10 | 190 | 0.23 | |
| 20 | 17 | 4 | 180 | 0.48 | |

TABLE 2-continued

Magnesium Oxide added to Vermiculite Foams

| | Wet Foam | | Dry Foam | | |
|---|---|---|---|---|---|
| Aqueous slurry % wt. vermiculite | % weight MgO per unit wt vermiculite | Mixing time (min) | Density Kg/m$^3$ | Compressive Strength MN/m$^2$ | Comments |
| 20 | 10 | 4 | 150 | 0.68 | resistance to disintegration in water was tested. All foams containing 5% MgO or greater were stable to water indefinitely |
| 20 | 10 | 4 | 160 | 0.62 | |
| 20 | 10 | 1 | 120 | 0.50 | |
| 20 | 10 | 1 | 120 | 0.50 | |
| 20 | 7.5 | 1.5 | 120 | 0.44 | |
| 20 | 5.0 | 2.5 | 110 | 0.30 | |
| 20 | 2 | 1 | 90 | 0.06 | resistant to soaking for 26 days. Slight swelling noticable with only 1% MgO. |
| 20 | 1 | 30 | 110 | 0.08 | |
| 20 | 1 | 10 | 100 | 0.08 | |
| 20 | 1. | 1 | 100 | 0.08 | |
| 15 | 10 | 1.5 | 80 | 0.31 | slurry prepared from dried vermiculite lamellae |
| 15 | 10 | 1.5 | 80 | 0.23 | |
| 15 | 10 | 2 | 130 | 0.54 | |
| 15 | 10 | 1.5 | 90 | 0.32 | |
| 20 | 20 | 0.8 | 200 | 0.50 | |
| 20 | 15 | 0.8 | 150 | 0.46 | |
| 20 | 10 | 1.5 | 130 | 0.29 | |
| 12 | 10 | 1.5 | 60 | 0.15 | |
| 10 | 10 | 3 | 50 | 0.11 | |

EXAMPLE 2

One Kg of vermiculite ore was treated with sodium chloride and n-butyl ammonium chloride solutions as described in Example 1. Foams were made using magnesium oxide as additive and compressive strengths and densities thereof measured as described in that sample Example. The results obtained were as follows for two different grades of vermiculite ore.

| | Compressive Strength MN/m$^2$ | Density Kg/m$^3$ |
|---|---|---|
| Superfine grade of South African ore | 0.44 | 88 |
| | 0.32 | 85 |
| Libby, Montana ore from USA | 0.27 | 75 |
| | 0.34 | 82 |
| | 0.31 | 73 |

These foams were submitted to heat treatment in a furnace at temperatures up to 1000° C. and the changes in the foam were measured. It was found that up to 700° C. less than 0.5% dimensional shrinkage occurred. The shrinkage increased sharply around 800° C. to give a maximum of 2% at 950° C.

Samples of foam were maintained at these temperatures for 24 hours and the loss in weight of the foam during the severe heat treatment was observed to be approximately linear over the whole temperature range averaging to ca. 5% at 400° C. and ca 20% at 1000° C.

What we claim is:

1. A strong, dry, rigid foam article having a density of less than 500 kg/m$^3$ and stable in water against disintegration when placed in water, said article consisting essentially of vermiculite lamellae and a compressive strength and water stability additive selected from the group consisting of magnesium oxide, magnesium hydroxide, calcium oxide and calcium hydroxide, said vermiculite lamellae being obtained from vermiculite which has been swollen by the action of aqueous salts and delaminated by mechanical shearing of the swollen granules to yield platelets having a thickness of less than one tenth of a micrometer.

2. The foam article as claimed in claim 1 wherein said additive is magnesium oxide.

3. The foam article of claim 1 or 2 containing from 1% to 40% by weight based on the vermiculite of said additive.

4. The foam article of claim 3 wherein said additive is present in an amount ranging from 3% to 15%.

5. The foam article as claimed in claim 4 having a density of less than 200 kg/m$^3$.

6. The foam article as claimed in claim 5 having a density of from 60 to 100 kg/m$^3$.

7. The foam article as claimed in claim 1 wherein the vermiculite lamellae have no dimension greater than 50 microns.

8. The foam article as claimed in claim 1 which additionally contains a filler.

9. A strong, dry article which is stable in water against disintegration when placed in water, said article consisting essentially of vermiculite lamellae and a strength and water stability additive selected from the group consisting of magnesium oxide, magnesium hydroxide, calcium oxide and calcium hydroxide said vermiculite lamellae being obtained from vermiculite which has been swollen by the action of aqueous salts and delaminated by mechanical shearing of the swollen granules to yield platelets having a thickness of less than one tenth of a micrometer.

10. A strong, water-stable article as claimed in claim 9 wherein the additive is magnesium oxide and is present in an amount ranging from 1% to 40% by weight based on the weight of said lamellae.

11. A strong, water-stable article as claimed in claim 9 or 10 wherein the amount of the additive is from 3% to 15% by weight based on the vermiculite lamellae.

12. A strong, dry water-stable article as claimed in claim 9 or 10 which is in the form of a sheet or paper.

13. A process for the production of a strong, water-stable article which comprises incorporating in an aqueous suspension of vermiculite lamellae in an amount of from 1% to 40% by weight based on the vermiculite lamellae, a strength and water-stability improver for the article which is a solid particulate material selected from the group consisting of magnesium oxide, magnesium hydroxide, calcium oxide and calcium hydroxide and removing the water from said suspension, said vermiculite lamellae being obtained from vermiculite which has been swollen by the action of aqueous salts and delaminated by mechanical shearing of the swollen granules to yield platelets having a thickness of less than one tenth of a micrometer.

14. A process for the production of a strong, water-stable foam structure which comprises foaming an aqueous suspension of vermiculite lamellae, to form a foam suspension, incorporating in the foamed suspension in an amount of from 1% to 40% by weight of the vermiculite lamellae compressive strength and water stability additive which is a solid particulate material selected from the group consisting of magnesium oxide, magnesium hydroxide, calcium oxide and calcium hydroxide, shaping the foamed suspension containing the additive, and removing water from the foamed suspension by evaporation to yield an article having a density of less than 500 kg/m$^3$ said vermiculite lamellae being obtained from vermiculite which has been swollen by the action of aqueous salts and delaminated by mechanical shearing of the swollen granules to yield platelets having a thickness of less than one tenth of a micrometer.

15. A process as claimed in claim 13 or 14 wherein the amount of additive is from 3% to 15% by weight based on the vermiculite lamellae.

* * * * *